H. D. BLUMENFELD.
SWITCH LEVER OPERATING MECHANISM.
APPLICATION FILED DEC. 29, 1919.

1,377,053.

Patented May 3, 1921.

WITNESSES:

INVENTOR
HARRIS D. BLUMENFELD.
BY
ATTORNEYS

UNITED STATES PATENT OFFICE.

HARRIS D. BLUMENFELD, OF HAVERSTRAW, NEW YORK.

SWITCH-LEVER-OPERATING MECHANISM.

1,377,053.

Specification of Letters Patent.   Patented May 3, 1921.

Application filed December 29, 1919. Serial No. 347,979.

*To all whom it may concern:*

Be it known that I, HARRIS D. BLUMENFELD, a citizen of the United States, and a resident of Haverstraw, in the county of Rockland and State of New York, have invented a new and Improved Switch-Lever-Operating Mechanism, of which the following is a full, clear, and exact description.

The present invention relates to new and useful improvements in accessories for motor vehicles.

It is the primary object of the present invention to provide means for operating the ignition switch when the same is placed on the exterior of a box which in turn is carried by the dashboard of the vehicle.

When the ignition switch is positioned as above mentioned, it is awkward for the driver to reach to properly operate the same, and it is a further object of the present invention to so construct a device of this character that such switch may be operated from a point adjacent the steering wheel of the vehicle.

Referring to the drawings—

Figure 1:
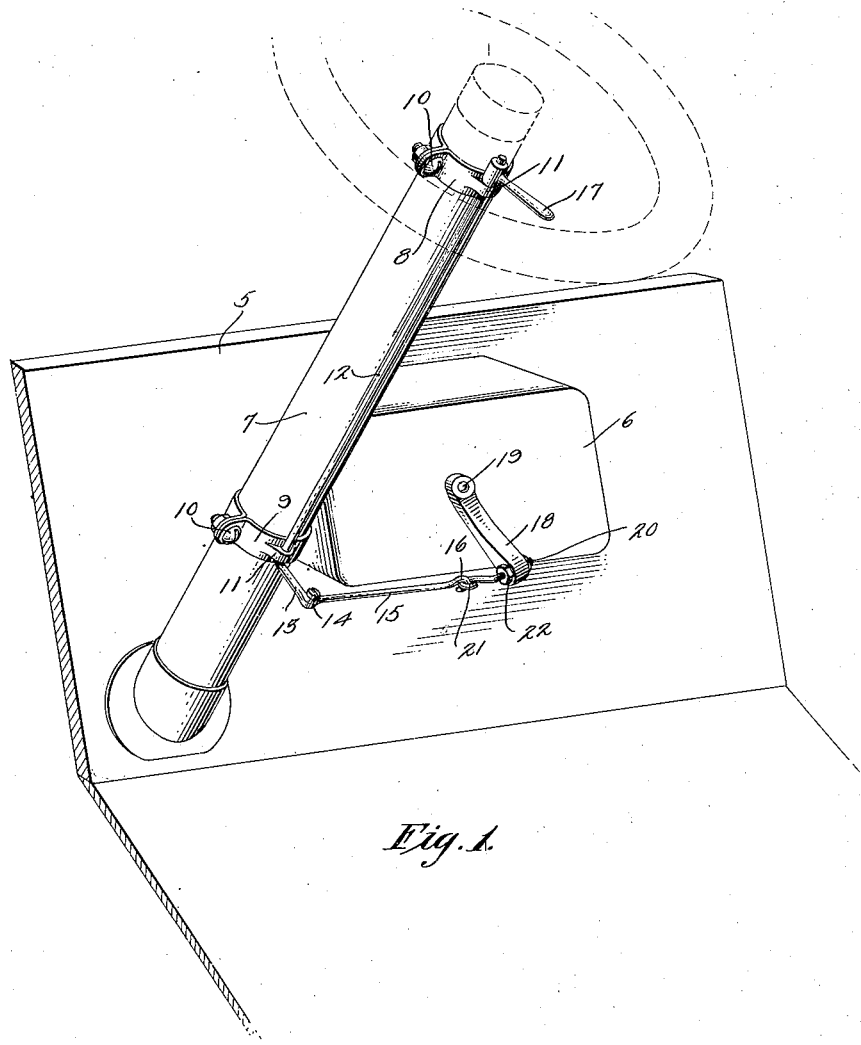
Figure 1 is a perspective view of the steering post and coil box of a motor vehicle showing the attachment in place thereon.
Figure 2:
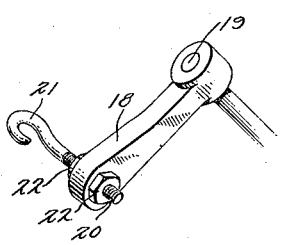
Fig. 2 is a detail perspective view.

Referring more particularly to the drawings, the reference character 5 designates the dashboard, 6 the coil box, and 7 the steering post.

Secured to the steering post in spaced relation to each other, is an upper ring 8 and a lower ring 9. These rings are constructed of two parts and secured together by means of a bolt 10, which serves to provide the necessary gripping action to retain the rings in place upon the steering post. Each of the rings 8 and 9 is provided with a bearing 11, and said bearing 11 is provided with a central opening, through which passes a rod 12, said rod being rotatably supported within the bearings 11. The lower end of the rod 12 is provided with a right-angular extension 13, and pivotally connected to said right-angular extension 13 by means of a screw or bolt 14, is a link 15, said link being provided on its opposite end with a hook or eye 16. Secured to the upper end of the shaft 12, is an operating handle 17, and said handle is adapted upon movement to the left or right to correspondingly rotate the shaft 12 in its bearings 11.

The reference character 18 designates the switch lever of the coil box, and said switch lever is pivoted, as at 19, in the ordinary manner. This switch lever 18 is provided with an opening near its outer end, and extended through said opening is the screw-threaded portion 20 of a hook member 21. Secured on opposite sides of the switch lever 18, and having threaded engagement with the screw-threaded portion 20 of the hook 21, are two nuts 22. By this arrangement it will be seen that as these nuts are loosened or removed, an adjustment of the hook member 21 may be obtained. This hook member 21 is adapted to be received by the eye 16 of the link as shown in Fig. 1.

The operation of the device is as follows: When the switch lever 18 occupies the position shown in Fig. 1, the ignition circuit of the motor of the vehicle is closed. If, now, it is desired to open or break the circuit, the handle 17 is grasped and moved to the left, which moves the right-angular extension 13 of the rod 12 in a corresponding direction, and rocks the switch lever 18 about its pivoted point 19 to a vertical position, in which position the circuit of the ignition system is broken.

From the foregoing description, it will apparent that the present invention provides means for operating the switch lever in the ignition circuit of a motor vehicle from a point adjacent the steering wheel, thus greatly increasing the accessibility of said ignition switch lever.

Claim:

In combination with the switch key and steering column of a motor vehicle, a hooked member having one end passed through the switch key, means for adjustably securing said hooked member to the switch key, a plurality of supporting members secured to the steering column, an operating member mounted in said supporting members, and a link pivotally connected at one end to the operating member and having its other end formed with a hook adapted to receive the hook of the hooked member whereby the switch key may be operated upon movement of the operating member.

HARRIS D. BLUMENFELD.